United States Patent [19]
Hay et al.

[11] Patent Number: 5,802,961
[45] Date of Patent: Sep. 8, 1998

[54] METHODS AND APPARATUS FOR PARTICULATE HEAT EXCHANGE AND TRANSFER

[75] Inventors: Lloyd F. Hay; Jerry M. Hougland, both of Oakdale; Christopher J. Rufer, Sacramento, all of Calif.

[73] Assignee: FMC Corporation, Chicago, Ill.

[21] Appl. No.: 555,522

[22] Filed: Nov. 9, 1995

Related U.S. Application Data

[63] Continuation-in-part of Ser. No. 228,079, Apr. 15, 1994, abandoned.

[51] Int. Cl.⁶ ..................................................... A47J 37/12
[52] U.S. Cl. ................................ 99/406; 99/404; 99/457; 165/120; 165/111; 366/149; 366/136
[58] Field of Search ..................................... 165/140, 120, 165/111; 99/459, 406, 404; 366/149, 136

[56] References Cited

U.S. PATENT DOCUMENTS

| | | | |
|---|---|---|---|
| 690,005 | 12/1901 | Anderson et al. | 99/459 |
| 780,415 | 1/1905 | Eavenson | 99/459 |
| 962,725 | 6/1910 | Stewart | 99/459 |
| 1,725,221 | 8/1929 | Steiner | 99/464 |
| 1,912,651 | 6/1933 | Nusbaum | 165/120 |
| 1,993,264 | 3/1935 | Duttweiler | 99/459 |
| 2,086,072 | 7/1937 | Fauth et al. | 87/13 |
| 2,089,215 | 8/1937 | Lomax | 210/151 |
| 2,105,782 | 1/1938 | Fauth | 87/13 |
| 2,246,045 | 6/1941 | Hirschberg | 100/48 |
| 2,478,889 | 8/1949 | Harris | 165/120 |
| 2,565,411 | 8/1951 | van Buuren | 241/106 |

(List continued on next page.)

FOREIGN PATENT DOCUMENTS

| | | | |
|---|---|---|---|
| 94883 | 12/1969 | France | 99/495 |
| 2952544 | 7/1981 | Germany . | |
| 273140 | 6/1970 | U.S.S.R. | 99/495 |
| 971872 | 11/1982 | U.S.S.R. | 99/495 |
| 1327873 | 8/1987 | U.S.S.R. | 99/495 |
| 1445679 | 12/1988 | U.S.S.R. | 99/495 |
| 1472488 | 4/1989 | U.S.S.R. | 99/493 |
| 1429767 | 3/1976 | United Kingdom . | |
| 1453972 | 10/1976 | United Kingdom . | |

*Primary Examiner*—Denise L. Ferensic
*Assistant Examiner*—Christopher Atkinson
*Attorney, Agent, or Firm*—Wood, Herron & Evans, L.L.P.

[57] ABSTRACT

Apparatus and methods for transferring particulate product contained in a compatible media and then separating or straining the particulate product from the compatible media. A housing is provided for containing the compatible media at an optimum level and includes an inclined portion having a particulate product inlet at a lower end thereof and separate particulate product and compatible media outlets at an upper end thereof. The compatible media outlet is located below the particulate product outlet. The housing contains a particulate product conveyor unit which includes a perforated tube and auger assembly for transferring the particulate product from the particulate product inlet to the particulate product outlet. The particulate product is heated or cooled while it is submerged within the compatible media and cross currents of media are supplied to increase heat transfer and conveyance of the product.

21 Claims, 4 Drawing Sheets

U.S. PATENT DOCUMENTS

| | | | |
|---|---|---|---|
| 2,625,175 | 1/1953 | Wilson | 137/577 |
| 2,635,104 | 4/1953 | Chayen | 260/412.6 |
| 2,793,582 | 5/1957 | Rothe et al. | 99/443 |
| 2,847,334 | 8/1958 | Kilburn et al. | 146/235 |
| 2,901,225 | 8/1959 | Abrams | 257/84 |
| 2,919,905 | 1/1960 | Bayard | 257/235 |
| 2,943,845 | 7/1960 | Jaklitsch | 165/120 |
| 3,082,541 | 3/1963 | Moore et al. | 34/62 |
| 3,086,444 | 4/1963 | Back | 99/239 |
| 3,176,606 | 4/1965 | Zoffman | 99/278 |
| 3,215,192 | 11/1965 | Sollich | 165/120 |
| 3,225,821 | 12/1965 | Sollich | 165/130 |
| 3,263,748 | 8/1966 | Jemal et al. | 165/120 |
| 3,641,924 | 2/1972 | Silbring | 99/406 |
| 3,715,977 | 2/1973 | Mackenzie | 110/117 |
| 3,754,735 | 8/1973 | Hoyle et al. | 259/4 |
| 3,774,524 | 11/1973 | Howard | 99/483 |
| 3,793,937 | 2/1974 | Lipoma | 165/111 |
| 3,854,527 | 12/1974 | Maroschak | 165/120 |
| 3,999,474 | 12/1976 | Sienkiewicz et al. | 99/249 |
| 4,010,001 | 3/1977 | Dollinger | 99/249 |
| 4,181,072 | 1/1980 | Hirahara | 99/353 |
| 4,214,013 | 7/1980 | Hirahara | 99/353 |
| 4,269,798 | 5/1981 | Ives | 264/73 |
| 4,306,493 | 12/1981 | Hain et al. | 97/517 X |
| 4,312,757 | 1/1982 | Brumfield | 210/646 |
| 4,361,083 | 11/1982 | Natusch | 99/459 |
| 4,385,553 | 5/1983 | Ihara et al. | 99/510 |
| 4,440,074 | 4/1984 | Ihara et al. | 99/510 |
| 4,457,383 | 7/1984 | Goldhahn | 165/111 |
| 4,474,553 | 10/1984 | Takahashi | 432/27 |
| 4,522,587 | 6/1985 | Miller | 165/92 X |
| 4,567,941 | 2/1986 | Coppolani et al. | 165/111 |
| 4,592,275 | 6/1986 | Frankl | 99/495 |
| 4,596,286 | 6/1986 | Stetler | 165/92 |
| 4,646,631 | 3/1987 | Ward | 99/483 |
| 4,697,508 | 10/1987 | Tallafus | 99/517 |
| 4,871,449 | 10/1989 | Lott | 210/110 |
| 4,872,404 | 10/1989 | Quetsch et al. | 100/125 |
| 4,921,719 | 5/1990 | Kohlbach | 426/521 |
| 4,942,051 | 7/1990 | Sardisco | 426/489 |
| 4,997,578 | 3/1991 | Berggren | 210/770 |
| 5,009,795 | 4/1991 | Eichler | 210/744 |
| 5,133,249 | 7/1992 | Zittel | 99/516 |
| 5,146,841 | 9/1992 | Zittel | 99/348 |
| 5,191,910 | 3/1993 | Eaton et al. | 165/120 X |
| 5,314,012 | 5/1994 | Mosse et al. | 165/111 |

FIG. I

METHODS AND APPARATUS FOR PARTICULATE HEAT EXCHANGE AND TRANSFER

This application is a continuation in part of application Ser. No. 08/228,079, now abandoned filed Apr. 15, 1994 entitled "Method and Apparatus for Particulate Heat Exchange and Transfer" now abandoned the disclosure of which is fully incorporated by reference herein in its entirety.

BACKGROUND OF THE INVENTION

The invention generally relates to heat exchangers and particulate transfer apparatus and, more particularly, relates to methods and apparatus for heating and/or cooling particulate product while transferring the product in a heat exchange system.

One of the main problems in the food processing and packaging industry is the loss of product quality during processing. This problem becomes especially acute when vegetables are diced since enzyme activity within the diced vegetable product significantly increases after dicing of the product. Therefore, the diced vegetable product must be preserved immediately following the dicing operation to prevent loss or downgrading of the product. Another problem is physical damage to the product, for example, during sterilizing and pumping thereof in processing operations.

Particulate food products are often heated prior to hot filling into storage containers. The particulates are then held for sterilization and cooled in the container. Alternatively, in aseptic processing the particulates are heated and held until sterilized and then cooled without losing sterility prior to filling into a sterile container.

Many of the formulated food products on grocery store shelves require identifiable particles of fruits or vegetables in the final product. Examples include the use of re-processed diced tomatoes in finished products such as ethnic sauces, pizza, soups and the like. In order to withstand the handling and additional cooking of the final process a relatively undamaged particulate product must be supplied to the formulator by a pre-processor of that product.

The pre-processor first converts raw fruits or vegetables from the field into a particulate form which, for example, may be a diced form. The product is then heated for enzyme and microbial deactivation. In an aseptic process, the product is heated within a compatible media which may be a liquid, held at a sterilizing temperature for an appropriate period of time and then cooled. The particulates are then separated from the compatible media and packed into sterile containers for distribution.

Devices have been developed for dewatering and/or heating particulate product on a continuous basis. Examples of such devices are found in U.S. Pat. No. 962,725 issued to Stewart; U.S. Pat. No. 3,715,977 issued to Mackenzie; U.S. Pat. No. 4,871,449 issued to Lott; and U.S. Pat. No. 5,146,841 issued to Zittel. Each of these patents has certain inherent limitations and disadvantages. For example, the patent to Zittel, although disclosing an improved apparatus for blanching vegetables with minimum damage thereto by providing water in the bottom of the blancher, provides no means for continuously replenishing the water in the blancher. The water must therefore must be replaced at predetermined time intervals by shutting the entire system down. Also, the amount of vegetable product contained within the perforated tube of Zittel is limited by the water level within the blancher which in turn is limited by the height of the product discharge. Although product might be placed within the perforated tube of Zittel such that it rises above the level of water in the blancher, this would result in imperfect heat transfer to the product. Additional problems of past processing operations involve the straining or separation of product from the media. Oftentimes, the strainers, which may be screens, become clogged or "blinded" by product thus lowering the efficiency and usefulness of the straining device.

SUMMARY OF THE INVENTION

Accordingly, it has been one object of the invention to provide a heat transfer and delivery apparatus which efficiently heats or cools particulate product, and especially particulate vegetable product, while simultaneously delivering the product from one processing operation to the next.

It has been another object of the invention to continuously replenish the supply of compatible heating or cooling media in the apparatus with fresh compatible media.

It has been yet another object of the invention to provide more effective heat transfer between the product moving through the apparatus and the compatible media within the apparatus.

It has been still another object of the invention to provide a cross flow of compatible media with respect to the moving particulate product to more effectively transfer heat between the compatible media and the product and to maintain the product on the effective transfer path.

It has been still a further object of the invention to reduce damage to the particulate product during transfer thereof and at the same time maintain a high rate of heat exchange between the compatible media and the particulate product.

It has been yet a further object of the invention to move the compatible media in the direction of the product delivery or transfer path within the apparatus to assist in moving product along the delivery or transfer path.

The present invention is premised on retaining particulate quality of the final product by:
1. Minimizing pumping of the particles to avoid mechanical damage or damage from the pumping pressure.
2. Rapid heat up of the particles for efficient enzyme de-activation and to minimize product quality degradation.
3. Rapid cool down of the particles to quickly firm the product in order to minimize mechanical damage.
4. Gentle conveyance of particles to minimize mechanical damage.
5. Controlled positive conveyance through the system on a first in/first out basis to provide reliable cook times and prevent settling out of the particulates from the compatible liquid.
6. Stable heating control for predictable product sterilizing temperatures.
7. Stable cooling control for consistent fill temperature to maximize quality after packaging.

The invention further enables reliable particulate sterilization, i.e., reliable heat penetration to the center of the particulates, by providing:
1. Predictable residence times of the particulates through controlled positive conveyance.
2. Stable temperature control of the heating media.
3. An identical time/temperature relationship between the compatible media and the particulates.
4. Controlled positive pressure in the process system to prevent ingress of contamination.

5. Rapid heat up of the particulates for microbial deactivation in minimal time.

Finally, apparatus of the present invention delivers a particulate product to the package with an acceptable ratio of particulates to compatible media by:

1. Efficiently separating particles from the compatible heating or cooling media.
2. Preventing the separating surface perforations from "blinding" or becoming clogged with product.
3. Controlling the liquid level of compatible heating/cooling media to prevent compatible liquid overflow at the particulate outlet.

Accordingly, the present invention essentially provides methods and apparatus for transferring a particulate product within a housing containing compatible media and, in the process, substantially dewatering the particulate product or, in other words, separating the compatible media from the particulate product before discharging it from the housing. The term "dewater" as used herein refers to the process of separating the compatible media from the particulate product regardless of what forms the particulate product and compatible media take in a given application. In this latter regard the term "compatible media" is defined as any substance which is in a fluid state or which can act as a fluid. While the preferred embodiments of the invention utilize liquid heating and cooling media, other forms of compatible media may be substituted in certain applications including gaseous compatible media or solid, granular compatible media capable of flowing as a fluid. Correspondingly, the particulates may be liquid based as in the case of diced tomatoes which are preferably heated and/or cooled in tomato juice or the particulates may be dry granular product which would be heated or cooled in a dry gaseous or dry granular compatible media.

The particulate product is dropped into either heated or cooled compatible media contained in a housing and is thereby quickly heated or cooled throughout to the desired temperature while being moved along a transfer path within the housing. Preferably, the compatible media is pre-heated or pre-cooled to a predetermined, desired temperature before adding the particulates. Once dropped into the compatible media, the particulates are fully contained within the compatible media until immediately prior to their discharge from the housing. Thus, the particulate product is quickly heated or cooled to a predetermined, desired temperature and then is maintained at the predetermined, desired temperature during substantially the entire transfer path before being discharged from the housing in a substantially dewatered state. A significant feature of the invention is the capability of maintaining particulates in a uniformly heated or cooled state while conveying them and then separating the compatible heating/cooling media from the particulates prior to discharge all in a manner which minimizes physical damage to the particulates.

Two specific embodiments of the invention are disclosed herein. Both embodiments of the present invention utilize a particulate product conveyor capable of transferring particulate product through a fully enclosed housing containing heated or cooled compatible media. The product is then strained of compatible media before discharging the product through an outlet in the housing. In each embodiment the particulate product conveyor comprises an inclined highly perforated rotatable tube including an inner auger rigidly secured therein for transferring particulate product from a lower end of the perforated tube to an upper end of the perforated tube. The perforated tube is contained in a housing or chamber which holds a compatible media which is a liquid in the preferred embodiments. When the particulate product is diced tomatoes, for example, the compatible media is preferably tomato juice. The perforated tube is substantially submerged within the compatible media.

The upper end of the perforated tube extends out of the compatible media and includes an outlet for discharging the particulate product in a substantially dewatered or strained condition. The housing preferably contains a compatible media discharge outlet which is located immediately inward of the particulate product outlet such that it is positioned at an elevation lower than the particulate product outlet. The location of the compatible media outlet allows the compatible media to be maintained at an optimum level within the housing. This optimum level allows the particulate product to be submerged in a compatible media until immediately prior to being discharged from the perforated tube and the housing.

An inlet conduit extends upwardly from the housing in each embodiment at the lower end of the particulate product conveyor. The inlet conduit includes a top opening for receiving particulate product. The inlet conduit further contains a side opening connected to an inlet line which is oriented horizontally to tangentially introduce compatible media into the inlet conduit. The tangentially disposed side inlet causes the compatible media to be introduced as a swirling current which assists in drawing particulate product down to the inlet end of the product conveyor or perforated tube. Higher volumes of compatible media within the inlet conduit cause the incoming particulate product to be heated or cooled faster. Each embodiment also provides a cross flow of compatible media through the perforated tube.

The first embodiment further includes an outer auger or spiral shaped impeller rigidly secured to the outer surface thereof for imparting a flow to the compatible media in a direction from the lower end of the perforated tube to the upper end of the perforated tube. The perforated tube, inner auger and spiral shaped impeller are all secured to a drive shaft which rotates these components as one unit within the housing. The drive shaft is preferably connected to an electric motor mounted to the housing.

The lower section of the housing in the first embodiment further contains a heat exchange coil which is also submerged in the compatible media and preferably rotates about an axis parallel to the axis of rotation of the conveyor drive shaft to create a cross current of the compatible media which moves across the particulate product being transferred up the perforated tube. A recirculation line connects between the lower section of the housing containing the rotary heat exchange coil and the side opening of the inlet conduit and includes a recirculation pump for pumping heated or cooled compatible media into the inlet conduit.

In the second embodiment, the rotating heat exchange coil is eliminated and is replaced by direct input of media to the housing and through the perforated tube in a cross flow pattern. The media is preferably input through a series of nozzles directed into the housing generally along the length of the perforated tube. Two sets of spray inputs or nozzles are preferably provided with one set being located along the top of the perforated tube and one set being located along the side of the perforated tube which rotates in an upward direction. The media is removed through multiple outlets along the entire underside of the particulate heat exchanger housing by a circulating pump which feeds a separate media heat exchanger. The media is heated (or cooled) to the desired temperature by the media heat exchanger. Upon exiting the media heat exchanger, the media returns to the particulate heat exchanger by way of the two sets of spray inputs in a recirculating manner. Yet another stream of media from the heat exchanger is directed to the product feed hopper as previously described with respect to the first embodiment.

The product is conveyed and contained by the rotating action of the auger enclosed by the perforated tube. The cross flow current of media from the top spray inputs directs the product towards the lower inside surface of the perforated tube. The side spray current of media forces the particulates away from the inside surface of the perforated tube, toward the center and into the cross flow current from the top spray inputs creating a gentle tumbling action. Also, this tumbling increases the efficiency of conveyance by preventing mass rotation or suspension of particulate within the compatible media. This occurs generally when there is not a relatively large differential in specific gravity between the particulates and the compatible media, i.e., when the specific gravity of the particulate approaches or is below the specific gravity of the media. In these cases in which the particulates will tend to be easily "stirred up" and suspended, the second embodiment functions especially well.

When the heat exchanger is applied in an inclined mode the upper end of the auger and perforated tube will project above the level of the media. Above the media level the side sprays continue to insure forward movement of the product by direct impingement and gravity rather than creating a current.

In the second embodiment the cross currents of media created by the upper and side spray nozzles also effect better heat transfer to the particulate product. The tumbling action increases the efficiency of heat exchange by constantly reexposing all surfaces of each particulate to the recirculated heated (or cooled) media.

Finally, these pressurized sprays impinging on the perforated tube continuously prevent "blinding" or clogging of the perforations.

Further objects and advantages of the present invention will become more readily apparent to those of ordinary skill in the art upon review of the following detailed description of the preferred embodiments thereof taken in conjunction with the accompanying drawings.

BRIEF DESCRIPTION OF THE DRAWINGS

FIG. 3A is a cross sectional view taken along line 3A—3A of FIG. 3; and

DETAILED DESCRIPTION OF THE PREFERRED EMBODIMENTS

Figure 1:
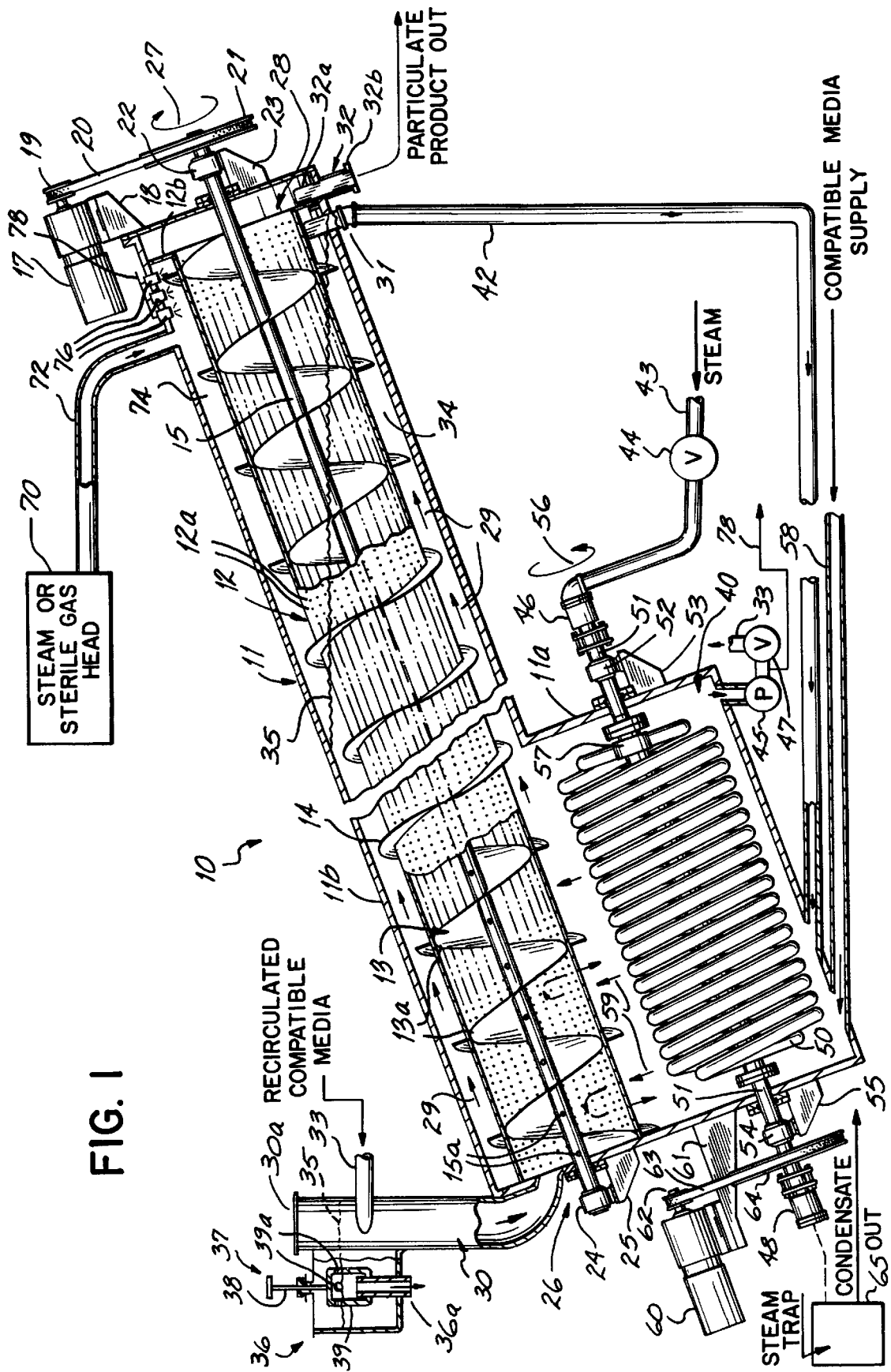
FIG. 1 is a diagrammatic view in partial cross section of apparatus constructed in accordance with a first embodiment of the present invention.

An apparatus 10 constructed in accordance with a first embodiment of the invention shown in FIG. 1. Apparatus 10 includes a housing 11 having a perforated tube 12 preferably mounted for rotation within housing 11 and further having a large number of perforations or apertures 12a along its entire length and about its entire periphery. The size of the individual apertures 12a is chosen so as to be smaller than the size of the particulates within the tube 12 thereby maintaining the particulates within the tube 12 but allowing transfer of media therethrough. The housing 11 is preferably a free standing structure and includes a support structure (not shown) which allows the housing 11 to assume an inclined orientation as shown in FIG. 1. As will become more readily apparent upon further review of this description, the housing 11 may actually take on many forms other than the one shown in FIG. 1 while still achieving the objectives of the present invention.

The perforated tube 12 contains an inner auger 13 which is preferably secured along outer portions 13a thereof to the inner surface of the perforated tube 12 such as by welding. An outer auger or spiral shaped impeller 14 is rigidly attached to the outer surface of the perforated tube 12 along its entire length also preferably by welding. Inner auger 13 and impeller 14 are preferably of identical pitch length for reasons discussed below. A drive shaft 15 extends along the central axis of the perforated tube 12 and through the center of the inner auger 13. Drive shaft 15 is rigidly secured to the inner auger 13 by means such as welding. Drive shaft 15 may be hollow or have a longitudinal bore and a plurality of apertures 15a such that liquid compatible media may be introduced into perforated tube 12 by way of shaft 15 to aid in creating a homogeneous temperature distribution in the compatible media. Perforations 15a preferably extend only part way along drive shaft 15.

An electric motor 17 is secured to the housing 11 by a support bracket 18 and is operatively connected to the drive shaft 15 for rotating the perforated tube 12, inner auger 13, impeller 14 and the drive shaft 15 as one unit. The electric motor 17 includes an output wheel 19 which receives a belt 20 connected to another wheel 21 secured to one end of the drive shaft 15. The drive shaft 15 is supported by bearing units 22, 24 coupled to opposite ends of the drive shaft 15 and attached to the housing 11 by respective brackets 23, 25. Motor 17 rotates shaft 15 in the direction of arrow 27.

The housing 11 is preferably divided into a lower section 11a and an upper section 11b. Upper section 11b includes the perforated tube 12 and is preferably inclined to define a particulate product transfer path having a lower end 26 and an upper end 28. The rotating perforated tube 12 transfers product from the lower end 26 to the upper end 28 on a first in/first out basis. It will be appreciated that this creates positive movement of product through apparatus 10 and produces predictable heat transfer times for the product within apparatus 10. In the case of heating for sterilization, for example, this is important since achieving the desired temperature is necessary but heating the product too long can adversely affect its quality.

An inlet conduit 30 connects with upper section 11b of housing 11 proximate lower end 26 of the product transfer path or perforated tube. Inlet conduit includes a top opening 30a to allow particulate or diced product to be introduced into the perforated tube 12 at the lower end 26 of the transfer path. A side, horizontally oriented inlet line 33 is also connected to inlet conduit 30 for providing recirculation of compatible media as discussed below. Upper section 11b of the housing 11 further includes a compatible media outlet 31 and a particulate product outlet 32 proximate the upper end 28 of the product transfer path. Compatible media outlet 31 is located immediately inwardly from and at a lower level or elevation than the particulate product outlet 32. Particulate product outlet 32 preferably comprises a slot 32a in upper housing section 11b which extends along a part of the lower periphery of housing section 11b. For example when upper housing section is shaped cylindrically, slot 32a of outlet 32 may extend along about 80°–120° thereof or, in other words, from about the "4 o'clock" position to about the "8 o'clock" position. An outer peripheral flange 12b on perforated tube 12 is disposed immediately inward of slot 32a and prevents particulate product from falling back into compatible media 34 after it exits at upper end 28. An outlet fixture 32b is attached to slot 32a and directs the particulate product to a suitable outlet pipe (not shown). Outlet fixture 32b is preferably funnel-shaped when viewed from the end of housing 11. Compatible media outlet 31 may be designed similarly to particulate product outlet 32, although this is not critical.

The location of the compatible media outlet 31 proximate the upper end 28 of the product transfer path within housing section 11b causes the compatible media 34 to be maintained at an optimum level 35 which submerges a substantial portion of the perforated tube 12 and therefore submerges the particulate product being transferred within the perforated tube 12 during substantially its entire travel path between the lower end 26 and upper end 28 of the upper housing section 11b. The length of this travel path and the speed of rotation of perforated tube 12 and attached auger 13 determine the residence time of the product in the compatible media 34. In an aseptic operation, this residence time may, for example, correspond to an optimum sterilizing time.

To further control the level 35 of compatible media 34, an overflow weir 36 is attached to inlet conduit 30 and in fluid communication therewith such that conduit 30 and weir 36 contain the same level 35 of fluid media 34 during operation. Overflow weir 36 includes a fluid outlet 36a and a suitable overflow or dump valve 37. Although valve 37 may comprise any one of a number of conventional valves, it may as one example be comprised of an axially adjustable threaded valve stem 38 connected to a hollow member 39 which contains one or more apertures 39a. Member 39 is open at a lower end to slidingly receive, in a liquid sealing manner, outlet 36a. It will be appreciated that axial, downward adjustment of valve 37, by threaded valve stem 38, will allow the operator to lower level 35 by allowing liquid media 34 to leave the system through apertures 39a and outlet 36a. On the other hand, as long as apertures 39a are above level 35 overflow weir 36 will not affect level 35. Preferably, lower housing section 11a is fed a metered flow of fresh compatible media through inlet conduit 58 which creates a constant overflow and freshening of the compatible media.

The lower section 11a of the housing 11 contains a heat exchange system 40 which preferably comprises a rotatable heat exchange coil 50. Heat exchange coil 50 rotates about an axis parallel to the axis of drive shaft 15. Heat exchange system 40 is designed to either heat or cool compatible media 34 contained in the housing 11 depending on the particular application of apparatus 10. To this end, the heat exchange system 40 includes an inlet conduit 43 for allowing the introduction of a heating medium such as steam or a cooling medium such as a refrigerant into rotatable heat exchange coil 50. A valve 44 is provided to control the introduction of the heat transfer medium into the heat exchange coil 50. The heat exchange coil 50 is supported within the lower housing section 11a by a hollow drive shaft 51 which is supported at opposite ends thereof by bearing units 52, 54 with the bearing units 52, 54 being rigidly secured to the lower housing section 11a by respective brackets 53, 55. Inlet conduit 43 is coupled to the hollow drive shaft 51 by a rotatable fluid coupling 46. Another rotatable fluid coupling 48 is coupled to the opposite end of the hollow drive shaft 51 to allow the condensed steam or other heating or cooling media to exit the rotatable heat exchange coil 50 and the hollow drive shaft 51.

Drive shaft 51 is further connected to the rotatable heat exchange coil 50 by a "T"-fitting 57 which allows the steam or other heating or cooling media to be directed from the hollow drive shaft 51 into the rotatable heat exchange coil 50. Another "T"-fitting (not shown) is connected to the opposite end of the rotatable heat exchange coil 50 to allow the condensed steam or other heating or cooling media to exit the coil 50 at the outlet end thereof.

Recirculated compatible media is directed from media outlet 31 to lower housing section 11a and heat exchange system 40 through recirculation or return line 42. As mentioned above, compatible media is also recirculated in fluid line 33 by pump 45 and through valve 47. More particularly, recirculation line 33 is tangentially connected and horizontally oriented immediately adjacent to inlet conduit 30. Heated or cooled compatible media 34 is thereby pumped into inlet conduit 30 from lower housing section 11a by pump 45 and controlled by valve 47. Liquid compatible media 34 enters inlet conduit 30 tangentially to create a swirling current of liquid within inlet conduit 30. The swirling current of liquid rapidly draws particulate product in a downward direction within conduit 30 after it is dropped through top opening 30a. The ratio of amount of recirculated media 34 to the amount of incoming particulates dictates the rapidity of initial heating, or cooling, of the particulates within conduit 30. Upon entering upper housing 11b, the liquid compatible media blends with the cross flow created by rotary coil 50. The location of recirculation line 33 compliments the cross flow imparted by rotary coil 50 such that media 34 is conveyed, not pumped, along with particulates by the action of auger 13 and impeller 14 along the transfer path toward its upper end 28.

Heat exchange coil 50 is rotated by a motor 60 which is rigidly secured to the housing 11 by a bracket 61. The output pulley 62 of the motor 60 is connected to a belt 63 which in turn is connected to a pulley 64 rigidly secured to the hollow drive shaft 51. When steam is used within the heat exchange system 40, the condensed steam exits the fluid coupling 48 and enters a conventional steam trap 65 which discharges condensate therefrom.

The motor 60 operates to rotate the heat exchange coil 50 in the direction of the arrow 56 such that a cross current of compatible media 34 is created within the housing 11 in the direction of the arrows 59. This cross current of compatible media 34 flows through the perforated tube 12 and the particulate product contained therein and thereby more efficiently transfers heat between the compatible media 34 and the particulate product. Once the particulate product and compatible media 34 are conveyed past the cross current 59, an identical time/temperature relationship is established therebetween since both are being conveyed by the leading surfaces of the inner and outer augers 13, 14 which are of identical pitch length.

When apparatus 10 is used in the food processing industry such as during the processing of diced tomatoes, a supply source 70 of steam, sterile nitrogen or other sterile gas is supplied via inlet conduit 72 leading to area 74 within upper housing section 11b. Area 74 is defined as being the area above level 35 of compatible media 34. The sterile gas or steam contained within area 74 is controlled to a low but positive pressure to prevent the ingress of contaminants such as, for example, ambient air. The sterile atmosphere in area 74 maintains the particulate food product in a sterile condition during the time between its emergence from the compatible media 34 and its discharge from the housing 11 through the particulate product outlet 32.

A plurality of spray nozzles 76 are also provided at the uppermost end of upper housing portion 11b. Spray nozzles 76 are connected to a common fluid line 78 which draws pressurized compatible media from fluid conduit 33 on the pressure side of pump 45. Spray nozzles 76 discharge a constant pressurized spray of compatible media 34 to clean out or back flush the perforations 12a at the upper end of perforated tube 12. This ensures efficient drainage of compatible media 34 from perforated tube 12 at the upper end thereof before the particulate product exits at outlet 32.

Figure 2:
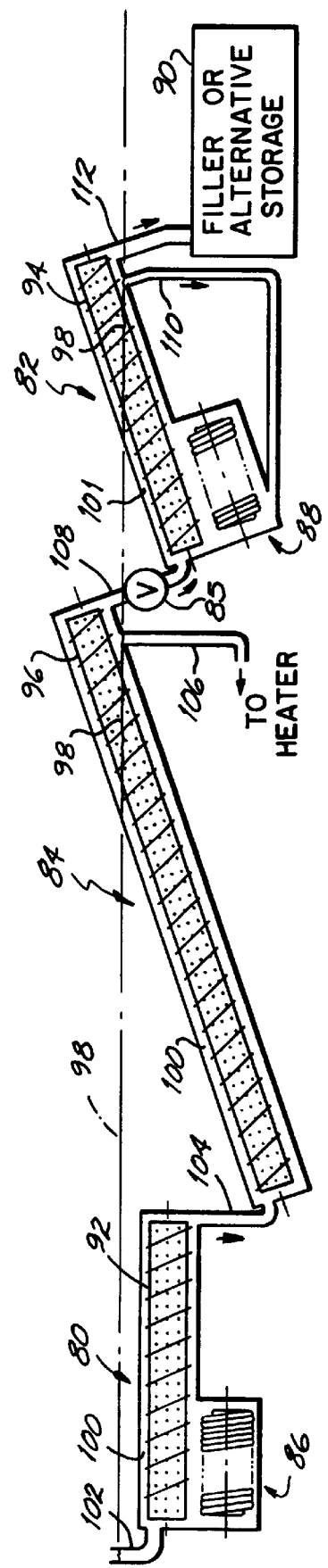
FIG. 2 is a schematic view of a system employing multiple apparatus connected in series for respectively heating, holding and cooling particulate product.

As shown schematically in FIG. 2, a plurality of particulate transfer apparatus, each being constructed using the concepts disclosed with respect to the embodiment FIG. 1, may be connected in series for multi-stage processing operations. For example, during a food processing operation the particulate food product may be heated within a first transfer apparatus 80 and cooled within another transfer apparatus 82 before being stored or packaged. An intermediate transfer apparatus 84 may also be connected between the respective heating and cooling apparatus 80, 82 for added residence time where required. Transfer apparatus 80 and 82 include respective heat exchange units 86, 88 preferably constructed substantially in accordance with the embodiment shown in FIG. 1. Transfer apparatus 82 and 84 each preferably include the source of sterile fluid 70 and inlet 72, as shown in FIG. 1, for creating a positive pressure sterile atmosphere above the level of compatible media and, in addition, each apparatus 82, 84 includes cleaning nozzles 76 as also shown in FIG. 1. For clarity, these features have not been shown in FIG. 2. Heat exchange unit 86 is used as a heater while heat exchange unit 88 is used as a cooler. After the particulate product has been heated and cooled by the system shown in FIG. 2 as described further below, the product is discharged from apparatus 82 into, for example, a filler or alternative storage 90.

As further shown in FIG. 2, apparatus 80, 82, 84 have respective rotating perforated tubes 92, 94, 96 which each include an inner auger and outer impeller as discussed with respect to FIG. 1. Apparatus 82, 84 and their perforated tubes 94 and 96 are inclined and contain a level 98 of compatible media 100. On the other hand, apparatus 80 may be horizontally oriented as shown such that the product is completely submerged in compatible media 100 during its entire travel through perforated tube 92. In this regard, since the product is desired to remain heated until it reaches the cooling operation performed by apparatus 82, the product remains submerged in heated compatible media 100 until it reaches the upper end of apparatus 84 where it is discharged into cooling apparatus 82 by way of a rotary isolation valve 85. Rotary isolation valve isolates the hot steam, which is preferably used in apparatus 84 to create a sterile atmosphere in the area above the compatible media 100, from the cooling apparatus 82. Due to space limitations, valve 85 is shown schematically in the drawing to be below level 98, however, those of ordinary skill will recognize that it will actually be positioned above level 98 in order to function as a vapor lock. Rotary isolation valve 85 may comprise a positive displacement pump, such as a gear pump, which will direct particulate product from apparatus 84 to apparatus 82 but will prevent any appreciable amount of vapor from passing between apparatus 84 and 82. As with apparatus 10 of FIG. 1, apparatus 82 and 84 drain compatible media proximate an upper end thereof while discharging substantially drained product at the upper end.

Figure 3:
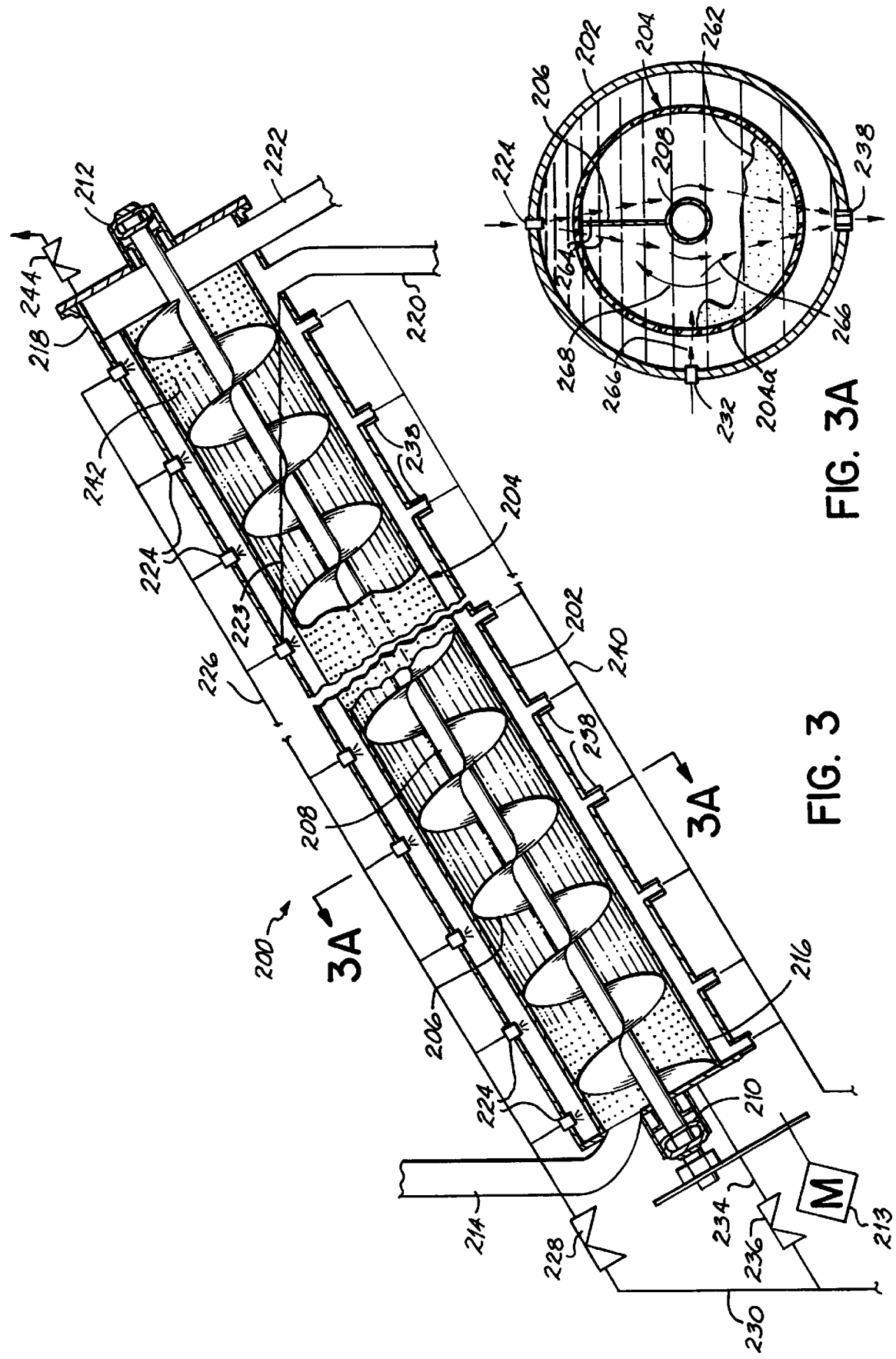
FIG. 3 is a diagrammatic view in partial cross section of apparatus constructed in accordance with a second embodiment of the present invention.

Referring now to FIG. 3, a second embodiment of the present invention is schematically illustrated. In this embodiment, apparatus 200 does not include the rotating heat exchange coil of the first embodiment and therefore includes a generally cylindrically shaped housing 202 which receives a rotating perforated tube 204. Like the first embodiment, an auger 206 is rigidly affixed to the inside surface of perforated tube 204 as well as to a central drive shaft 208. A pair of bearing units 210, 212 support drive shaft 208 for rotation. A motor 213 is operatively connected to drive shaft 208 to effect rotation as in the first embodiment. A particulate product inlet 214 is connected to a lower end 216 of the inclined perforated tube 204. At the upper end 218, a media overflow outlet 220 and a product outlet 222 are included and designed as described above with respect to the first embodiment. Media overflow outlet 220 maintains the level 223 of media within housing 202.

Referring to FIGS. 3 and 3A, a plurality of upper nozzles 224 are connected along the top of housing 202 and receive media from supply line 226 which may be controlled through valve 228 connected to a main supply line 230. In addition, a like plurality of side spray nozzles 232 are connected along the length of housing 202 to direct media spray through an upwardly rotating side 204a of tube 204. Nozzles 232 are connected to supply line 234 which is regulated through valve 236 connected to main supply line 230 as shown in FIG. 3. Finally, a plurality of outlets 238 are connected to housing 202 along the bottom thereof to allow discharge of media from housing 202 into a recirculation line 240 as shown in FIG. 3. The media level 223 in housing 202 is regulated by the overflow at 220 and remains at level 223 substantially as shown in FIG. 3. An upper space 242 is thereby provided into which the product is carried within perforated tube 204 and strained or dewatered prior to being discharged into product outlet 222. A vent valve 244 is connected to upper space 242 to allow venting of noncondensable gases. The inclined progression of product rising above the level 223 of media insures the separation of the noncondensable gases into the head space 242 created at the upper end of housing 202 and perforated tube 204 which is vented to atmosphere.

The atmosphere in head space 242 may be dictated by the particular process or application. A sanitary heating system might be open to breathe freely to atmosphere with the head space 242 consisting of process vapors and noncondensables released from the product. An aseptic heating system might have a steam atmosphere within head space 242 controlled to a slight positive pressure along with vent 244. In an aseptic cooling system, the head space atmosphere 242 might consist of a sterile gas, such as nitrogen, also controlled to a slight positive pressure.

Figure 4:
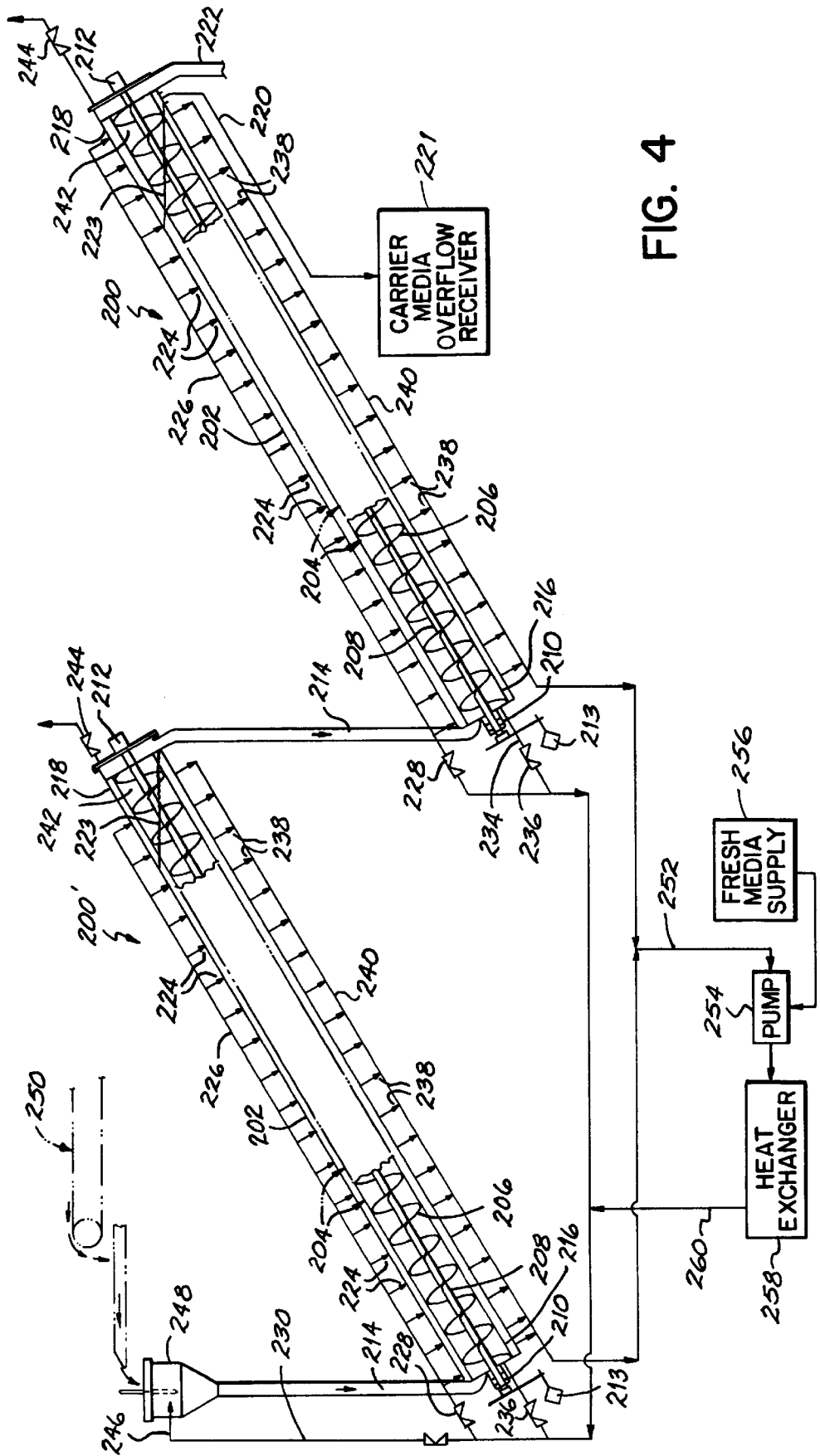
FIG. 4 is a schematic view of a system employing multiple apparatus of the second embodiment.

A multistage system utilizing apparatus 200 of the second embodiment is shown in FIG. 4. In this regard, two apparatus 200, 200' are shown connecting with inclined orientations and in series with each other. Apparatus 200' is somewhat modified with respect to apparatus 200 in that a product feed system is provided which will be described below and the upper media overflow outlet has been eliminated such that product and any overflow of media discharges from outlet 222. Outlet 222 then becomes inlet 214 of apparatus 200. Overflow of media through outlet 222 of apparatus 200' is preferably maintained by subsequent overflow at outlet 220 of apparatus 200. All other aspects of apparatus 200 and 200' are as described above with respect to FIGS. 3 and 3A and therefore a repeat of such details is not necessary.

With respect to additional system details, as previously noted, main supply line 230 supplies media to nozzle supply lines 226 and 240 of both apparatus 200 and 200'. In addition, main supply line 230 includes a branch extending up to an inlet 246 of product feed hopper 248. Inlet 246 injects media in a tangential, swirling manner as described with respect to the first embodiment. A product feed conveyor system 250 is provided to supply particulate product into feed hopper 248. Media discharge lines 240 of both apparatus 200 and 200' are connected to an inlet 252 of a pump 254. Pump 254 therefore provides suction to draw media from outlets 238 of both apparatus 200 and 200'. Pump 254 further draws fresh media from a media supply 256 to replenish media in apparatus 200, 200' on an ongoing basis. The outlet of pump 254 is connected to a media heat exchanger 258 which either heats or cools the media prior to discharging the media under pressure into line 260 and finally into main supply line 230. As further shown in FIG. 4, media overflow outlet 220 of apparatus 200 is connected to a media overflow receiver 221 which may be connected to a suitable salvage system.

Operation of the First Embodiment

Referring to FIG. 1, housing 11 is first filled with compatible media 34 which, in the case of processing diced tomatoes, for example, may be comprised of tomato juice. The housing 11 is filled with compatible media 34 until it reaches a level 35 as shown in the Figure. Particulate product fed into top opening 30a of inlet 30 falls directly into a recirculated mass of swirling hot or cold compatible media which instantly heats or cools the particles and draws them down conduit 30 and into lower end 26 of the rotating perforated tube 12. Motor 17 rotates the drive shaft 15 and resultingly rotates the perforated tube 12, inner auger 13, and impeller 14 in the direction of arrow 27 as one unit. The rotation of perforated tube 12 and inner auger 13 mechanically transfers the particulate product from the lower end 26 to the upper end 28 of both the perforated tube 12 and upper section 11b of the housing 11. In addition, the rotation of the impeller 14 with the perforated tube 12 creates a current of compatible media 34 in the direction of arrows 29 toward the compatible media outlet 31 to provide a hydraulic assist in the conveyance of the particulates. Buoyancy of the particulate product within perforated tube 12 and liquid compatible media 34 helps to insulate the product from mechanical damage during transfer. Heat exchange coil 50 is rotated by motor 60 to either heat or cool the compatible media 34 while simultaneously creating a circular cross current 59 of compatible media 34 transversely through perforated tube 12 to optimize heat transfer to the product.

Compatible media 34 is discharged from the compatible media outlet 31 and weir 36 in order to maintain area 74 of upper housing section 11b free of compatible media 34. Perforations 12a at the upper end of perforated tube 12 are constantly flushed or cleaned by compatible media discharged from nozzles 76. Particulate product contained within the uppermost section of the perforated tube 12 will thereby be substantially dewatered or strained of compatible media 34 by drainage of compatible media 34 through perforations 12a at the upper end of perforated tube 12. The strained or dewatered particulate product is then discharged out of the upper end of perforated tube 12 and through particulate product outlet 32 for packaging or further processing.

Level 35 of compatible media 34 is maintained by a combination of media recirculating under pressure through conduit 33 into inlet conduit 30, media recirculated from outlet 31 through line 42 to lower housing section 11a and, as needed, media being drained from the system through overflow weir 36 and freshly supplied to the system via line 58.

Referring now to FIG. 2, as one example of a system using multiple transfer apparatus of the first embodiment, operation involving an initial heating stage and a final cooling stage will be described. Particulate product is fed into inlet 102 of apparatus 80 and into rotating perforated tube 92. Perforated tube 92 conveys the product, submerged in heated media 100, to outlet 104 which also acts as the inlet to apparatus 84 for both product and compatible media. The product is then conveyed up perforated tube 96. At an upper end of apparatus 84, the heated compatible media 100 is drained through outlet 106 and directed to a heater which, for example, may be heat exchange unit 86. Product is discharged through outlet 108 of apparatus 84, through rotary isolation valve 85 and into cooling apparatus 82 and, specifically, perforated tube 94 thereof. At an upper end of cooling apparatus 82, cooled compatible media 101 is drained through outlet 110 and, for example, recirculated back through cooling unit 88. The strained particulate product is discharged through outlet 112 into, for example, a filler or alternative storage 90.

Operation of the Second Embodiment

Referring now to FIG. 4, particulate product 262 (FIG. 3A) is fed from conveying system 250 into feed hopper 248 and down into inlet 214 leading to the lower end 216 of housing 202 and perforated tube 204. A swirling current of media is provided by the injection of media into inlet 246 of feed hopper 248. The two apparatus 200, 200' are each filled with compatible media to the level 223 as shown in FIG. 4. Motor 213 rotates drive shaft 208, perforated tube 204 and auger 206 to mechanically transfer the particulate product from lower end 216 to upper end 218 of apparatus 200'.

Referring now to FIG. 3A, as the particulate product 262 is mechanically transferred along the length of perforated tube 204, spray nozzles 224 and 232 direct spray into housing 202 as shown and therefore create currents of media respectively in the directions of arrows 264 and 266. Drive shaft 208, perforated tube 204 and auger 206 all rotate in the direction of arrow 268. The current produced by side spray nozzles 232 and indicated by arrows 266 prevents the product 262 from ascending or climbing up the inside surface of side 204a and maintains it in a lower portion of perforated tube 204 such that effective mechanical transfer of relatively low specific gravity particulates to take place. The downwardly directed current indicated by arrows 264 and created by nozzles 224 also helps maintain the product 262 in the lower portion of perforated tube 204. Current 266 therefore tends to direct the product 262 toward the center of perforated tube 204 and into current 264 to create a gentle tumbling action. The tumbling action increases the efficiency of heat exchange by constantly reexposing all surfaces of each particulate to the recirculated heated or cooled media. This gentle tumbling action also increases the efficiency of the mechanical conveyance by preventing mass rotation of the particulate product in suspension which would prevent the necessary shearing action to take place between the particulate product and the surfaces of auger 206.

Referring again to FIG. 4, media is constantly discharged by being drawn through outlets 238 by pump 254 to maintain the level as shown. The particulate product is conveyed up into head space 242 within perforated tube 204, is strained therein, and is discharged through outlet 222 and into inlet 214 of apparatus 200. The process is then repeated within apparatus 200 as described above and the product is finally discharged in a dewatered state at product outlet 222 of apparatus 200.

Although preferred embodiments of the present invention have been fully detailed above, the artisan of ordinary skill will readily recognize many modifications and substitutions. For example, although the perforated tubes 12, 204 and inner augers 13, 206 have been shown and described as being rigidly secured to one another and therefore rotating as one unit, the perforated tubes 12, 204 and inner augers 13, 206 may instead be designed to rotate with respect to one another to mechanically transfer particulate product within the tubes 12, 204. The inner augers 13, 206 may be held in a rigidly fixed position while the perforated tubes 12, 204 is rotated or vice versa.

Alternatively, the perforated tubes 12, 204 and inner augers 13, 206 conveying system may be substituted with other types of conveying units with the only requirements being that the conveying unit transfers the particulate product from the lower end to the upper end of the housing while completely submerging the particulate product within the compatible media 34 and that the conveyor causes the particulate product to be strained of compatible media once the particulate product emerges from the upper level of the compatible media.

It will further be appreciated that the heat exchange unit 40 may optionally extend along a greater portion of the length of upper housing section 11b than is shown.

Finally, it will be understood that the housing, perforated tube, etc., may be formed in various lengths depending on the heating, cooling and/or delivery requirements of the particulate product.

Further modifications and substitutions will become readily apparent to those of ordinary skill in the art and applicants therefore intend to be bound only by the scope of the claims appended hereto.

We claim:

1. Apparatus for transferring particulate product contained in a fluid media comprising:

a housing capable of being filled with the fluid media and including a product conveying section having a particulate product inlet in a lower portion and a particulate product outlet in an upper portion, said housing further including at least one fluid media outlet located at an elevation below said particulate product outlet;

an inclined particulate product conveyor contained within the product conveying section of said housing for removing said particulate product from said particulate product inlet toward said particulate product outlet and separating said particulate product from said fluid media before discharging said particulate product through said particulate product outlet; and wherein said product conveyor further comprises a rotating perforated tube positioned such that a substantial length of said tube is completely submerged in said fluid media during operation and a plurality of spray inputs are provided lengthwise along an upper surface of the tube to impart a downward current of said fluid media within the substantial length of said perforated tube.

2. The apparatus of claim 1 wherein additional spray inputs are disposed to direct fluid media into a side surface of said perforated tube to create a sideward current of the fluid media through the tube.

3. Apparatus for transferring particulate product contained in a fluid media comprising:

an enclosed housing capable of being filled with a fluid media and including a particulate product inlet in a lower portion and a particulate product outlet in an upper portion, said housing further including at least one fluid media outlet located at an elevation below said particulate product outlet;

a perforated inclined tube mounted within said housing and including an auger therein, at least one of said perforated tube and said auger mounted for rotation to move said particulate product from said particulate product inlet toward said particulate product outlet and separating said particulate product from said fluid media before discharging said particulate product through said particulate product outlet;

a plurality of upper spray inputs disposed along an upper surface of said perforated tube for directing said fluid media into said perforated tube; and, a plurality of side spray inputs disposed along a side surface of said perforated tube for directing said fluid media into said perforated tube.

4. The apparatus of claim 3 further comprising a plurality of fluid media outlets disposed along a lower surface of said housing.

5. The apparatus of claim 4 wherein said fluid media outlets are operatively connected to a pump for drawing said fluid media out of said housing.

6. The apparatus of claim 5 wherein an outlet of said pump is connected to supply lines for directing pressurized said fluid media to said upper and side spray inputs.

7. The apparatus of claim 6 wherein one of said supply lines is connected to the particulate product inlet.

8. The apparatus of claim 6 wherein said supply lines are further connected to a heat exchanger for heating or cooling said fluid media prior to the fluid media being directed to said upper and side spray inputs.

9. The apparatus of claim 7 wherein said pump is connected to a separate fluid media supply, said pump drawing said fluid media from said supply into the heat exchanger and the supply lines.

10. The apparatus of claim 3 further including a vent connected to the upper portion of said housing for venting noncondensable gases from a head space created above said fluid media when said housing is filled with said fluid media.

11. The apparatus of claim 3 wherein said perforated tube is secured for rotation with said auger and a plurality of spray nozzles are affixed along the length of said housing to direct said fluid media through the perforated tube during rotation.

12. Apparatus for transferring particulate product contained in a fluid media comprising:

an enclosed housing including a particulate product inlet and a particulate product outlet;

an inclined perforated tube mounted for rotation within said housing and containing an auger, said tube and auger mounted for rotation as a unit and such that a substantial length of said tube is completely submerged in said fluid media during operation, a drive for rotating said perforated tube and said auger, a plurality of fluid media inlets in said housing, said inlets including spray inputs positioned along an upper surface of said tube to be submerged in said fluid media during operation for directing a downward current of said fluid media through an outside of the perforated tube, and at least one outlet in said housing for discharging said fluid media from said housing at a level which submerges a substantial portion of said perforated tube, said fluid media outlet being located at an elevation below said particulate product outlet.

13. The apparatus of claim 12 wherein at least one spray input is located adjacent an upper end of said perforated tube so as to flush perforations in a portion of said tube disposed above an operating level of fluid media.

14. A method of processing a mixture of particulate product and fluid media comprising the steps of:

maintaining a level of fluid media in a chamber;

transferring said particulate product through an inclined perforated tube having a substantial length completely submerged in said fluid media and having an upper portion extending above said fluid media level;

creating a cross current of fluid media from above said perforated tube and through the submerged length of said tube in a generally downward direction;

straining said particulate product of said fluid media at a location above said fluid media level; and directing strained particulate product to a particulate product outlet of said chamber.

15. The method of claim 14 wherein said chamber includes an inlet conduit leading to a lower end of said perforated tube and, prior to the step of transferring said particulate product, the method further comprises the steps of:

creating a swirling current of said fluid media in said inlet conduit; and feeding said particulate product into said inlet conduit whereby said swirling current of said fluid media will direct said product to said lower end of said perforated tube.

16. The method of claim 14 further comprising the step of:

discharging said fluid media from said chamber through a fluid media outlet in said chamber to maintain said fluid media level within a predetermined range.

17. The method of claim 16 further comprising the step of recirculating said fluid media being discharged from said fluid media outlet back into said chamber.

18. The method of claim 14 further comprising the step of introducing sterile fluid into an area of said chamber above said level of fluid media.

19. The method of claim 18 further comprising the step of maintaining a positive pressure atmosphere of said sterile fluid within said area.

20. The method of claim 14 further comprising the step of creating a cross current of said fluid media through the submerged length of said tube in a generally sideward direction.

21. The apparatus of claim 12 further including a plurality of spray inputs positioned along a side surface of said tube for directing a sideward current of said fluid media through an outside surface of the perforated tube.

* * * * *

UNITED STATES PATENT AND TRADEMARK OFFICE
CERTIFICATE OF CORRECTION

PATENT NO. : 5,802,961
DATED : September 8, 1998
INVENTOR(S) : Lloyd F. Hay, Jerry M. Hougland and Christopher J. Rufer It is certified that error appears in the above-identified patent and that said Letters Patent is hereby corrected as shown below:

Column 14, line 25, delete "pressurized".

Column 15, line 4, before "fluid" insert --said--.

Signed and Sealed this

Ninth Day of March, 1999

Attest:

Attesting Officer

Q. TODD DICKINSON

Acting Commissioner of Patents and Trademarks